United States Patent [19] | [11] Patent Number: 4,582,744
Smyth, III | [45] Date of Patent: Apr. 15, 1986

[54] RUFFLED ORNAMENT AND METHOD OF FORMING SAME

[76] Inventor: S. Alton Smyth, III, Blackstone St., Uxbridge, Mass. 01569

[21] Appl. No.: 702,838

[22] Filed: Feb. 19, 1985

[51] Int. Cl.⁴ .............................................. B32B 3/28

[52] U.S. Cl. ...................................... 428/181; 156/204

[58] Field of Search ................. 428/4, 24, 25, 26, 181; 156/204

[56] References Cited

U.S. PATENT DOCUMENTS

| | | | |
|---|---|---|---|
| 1,818,578 | 8/1931 | Pedersen | 428/26 |
| 2,164,966 | 7/1939 | Tutein | 428/181 X |
| 2,479,731 | 8/1949 | Dibrell | 428/4 X |
| 2,660,826 | 12/1953 | Bennett | 428/4 X |
| 2,749,640 | 6/1956 | Scott | 428/43 |
| 3,750,731 | 8/1973 | Brimmell | 428/181 X |
| 4,125,656 | 11/1978 | Creamer | 428/181 X |
| 4,164,058 | 8/1979 | Barna | 428/181 X |

*Primary Examiner*—Henry F. Epstein
*Attorney, Agent, or Firm*—Salter & Michaelson

[57] ABSTRACT

A method of forming a ruffled ornament preferably comprises the steps of forming a tubular band of flexible sheet material, turning and drawing the band inwardly and together along one edge thereof to form a decorative element having a partially flattened, ruffled configuration and having a central aperture therethrough, and assembling a grommet on the decorative element so that it extends through the aperture and clampingly engages opposite surface portions of the decorative element adjacent the aperture to secure it in the partially flattened configuration. The ornament of the instant invention which is preferably formed by the method comprises a partially flattened, ruffled decorative element made from a tubular band of sheet material and a grommet which retains the decorative element in a partially flattened disposition.

9 Claims, 9 Drawing Figures

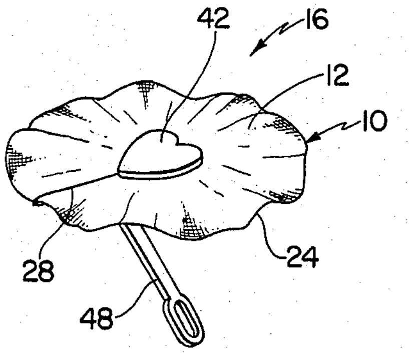
FIG. 1
FIG. 2
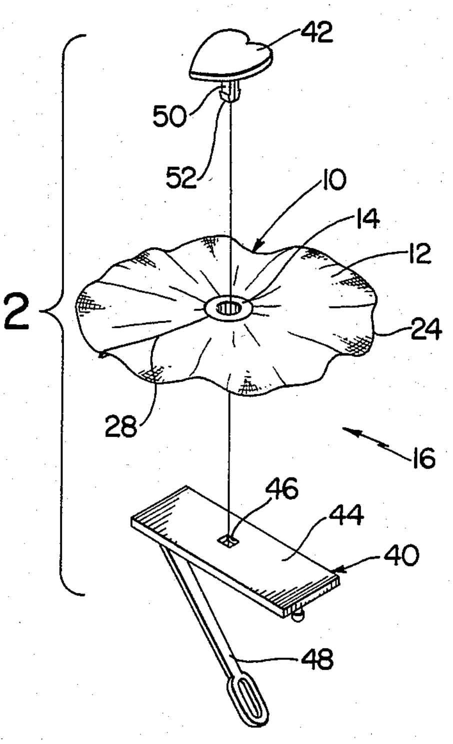
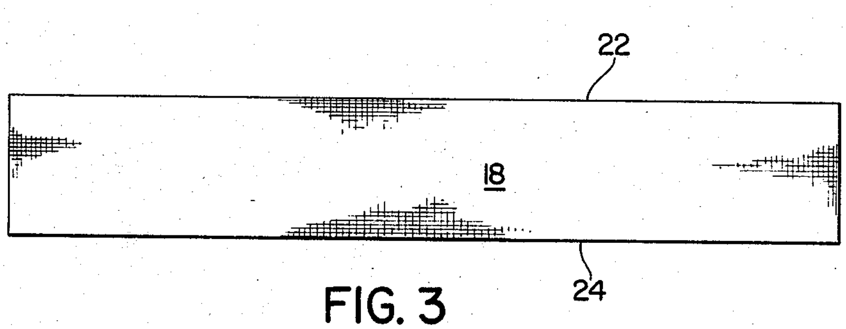
FIG. 3
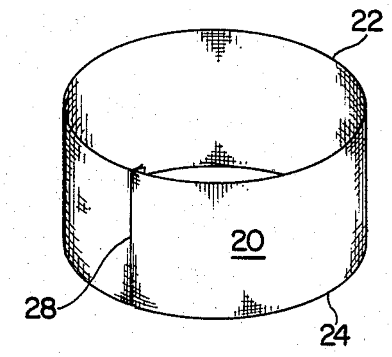
FIG. 4

RUFFLED ORNAMENT AND METHOD OF FORMING SAME

BACKGROUND AND SUMMARY OF THE INVENTION

The instant invention relates to ornaments of the type which are worn in the hair or on various articles of clothing and more particularly to a ruffled ornament for such applications and to a method of making the ornament.

The wearing of ruffled lace-like ornaments in the hair and on various articles of clothing has gained significant popularity in recent years. In this regard, it has been found that one type of ruffled ornament comprising a substantially circular, ruffled decorative element made of a flexible sheet material, such as a fabric, has become particularly popular with young girls and may be used for a wide variety of applications. Heretofore, the most common method of manufacturing an ornament of this type has been to first form a strip of sheet material into a tubular band. The band is then formed into a partially flattened, ruffled configuration by stitching it at a plurality of spaced points along one edge thereof, and turning and drawing the stitched edged portions of the band inwardly and together so that the band is formed into a substantially circular ornament having a reduced central aperture therethrough. Ornaments of this type have been effectively utilized for decorative purposes in a variety of applications, such as in barrettes and other articles to be worn in the hair. Further, heretofore, in many instances ornaments of this type have been secured on elements, such as barrettes and the like, by passing attaching means through the central apertures therein and frequently adhesives have also been utilized for permanently securing ornaments of this type on various types of elements.

Unfortunately, however, while ornaments of the abovedescribed type have found a high degree of popularity, heretofore they have been relativley expensive to manufacture. Specifically, it has been found that the manual stitching steps which have been required during the manufacture of ruffled ornaments of the above-described type in order to form them into and secure them in partially flattened, ruffled configurations have been highly time consuming, and hence they have significantly increased the costs of manufacturing ornaments of this type.

The instant invention provides a novel method of forming a ruffled ornament from a tubular band of flexible sheet material without the costly and time consuming stitching steps which have characterized the heretofore known methods for forming ornaments of this general type. In its broadest form, the method of the instant invention comprises a method of securing a decorative element of flexible sheet material in a partially flattened, ruffled configuration, wherein the decorative element is formed from a tubular band of sheet material which has been drawn and turned inwardly and together along one edge thereof to define a reduced central aperture in the decorative element. The broad form of the method comprises the step of assembling a grommet on the decorative element through the aperture therein so that the grommet clampingly engages the decorative element adjacent the aperture to secure it in a partially flattened, ruffled configuration. The instant invention also provides an effective method of forming a tubular band of flexible sheet material into a partially flattened, ruffled configuration, and for securing it in this configuration. This form of the method preferably comprises the steps of grasping a band of sheet material with a plurality of pairs of fingers at a plurality of spaced points adjacent one edge of the band and then turning the fingers inwardly and together to turn and draw the band inwardly and together to form a decorative element having a partially flattened, ruffled configuration and having a central aperture therethrough. After the decorative element has been formed in this manner, a grommet is assembled thereon so that it extends through the central aperture in the element and clampingly engages the element adjacent the aperture to secure it in the partially flattened, ruffled configuration, and finally the ornament is released from the fingers. Preferably, in both forms of the method, the portions of the decorative element which are adjacent the aperture are clamped between a pair of clamping members to retain the decorative element in a partially flattened, ruffled configuration before the grommet is assembled thereon. Preferably, one of the clamping members is of tubular configuration and the grommet is assembled on the decorative element through the center of the tubular clamping member in order to secure the decorative element in a partially flattened, ruffled configuration.

The instant invention also provides an effective ruffled ornament, which is preferably formed by the method of the instant invention. The ornament comprises a decorative element made from a tubular band of flexible sheet material, wherein one edge of the band has been turned inwardly and together to impart a partially flattened, ruffled configuration to the decorative element and to form a reduced central aperture therein, and a grommet which is assembled on the decorative element so that it extends through the aperture therein and clampingly engages the element adjacent the aperture to retain it in a partially flattened, ruffled configuration. The decorative element is particularly effective for use in a barrette construction comprising a barrette element, and securing means which extends through the grommet for securing the ornament on the barrette element.

Accordingly, it is a primary object of the instant invention to provide a method of securing a decorative element of the above-described type in a partially flattened, ruffled configuration.

Another object of the instant invention is to provide a method of forming a decorative element into a partially flattened, ruffled configuration from an open tubular configuration and for securing the decorative element in the partially flattened, ruffled configuration.

A still further object of the instant invention is to provide an effective ruffled ornament having a partially flattened configuration which can be effectively assembled with a barrette element for providing an ornamental barrette.

An even further object of the instant invention is to provide a method of manufacturing a partially flattened, ruffled ornament at a reduced cost.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view of a barrette comprising the ornament of the instant invention;

FIG. 2 is an exploded perspective view of the barrette;

FIGS. 3-7 illustrate the method of forming the ornament of the instant invention;

DESCRIPTION OF THE INVENTION

Figure 5:
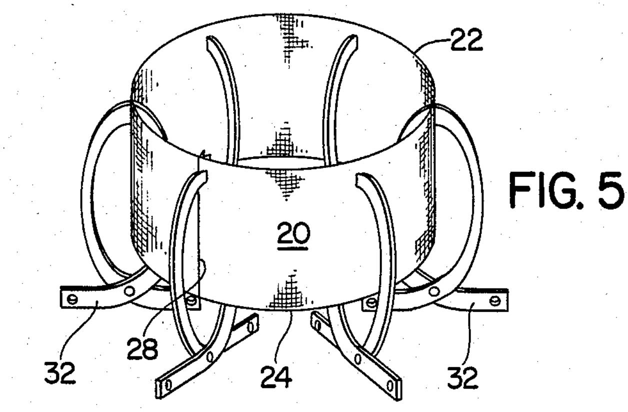
Figure 6:
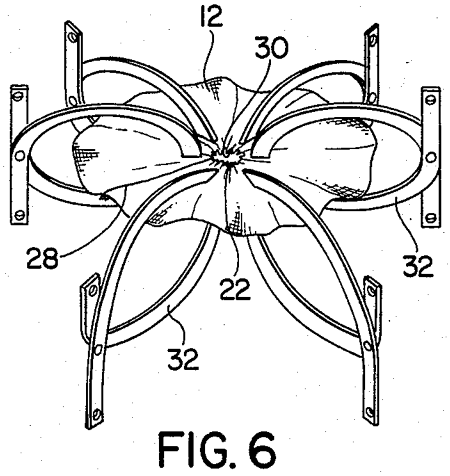
Figure 7:
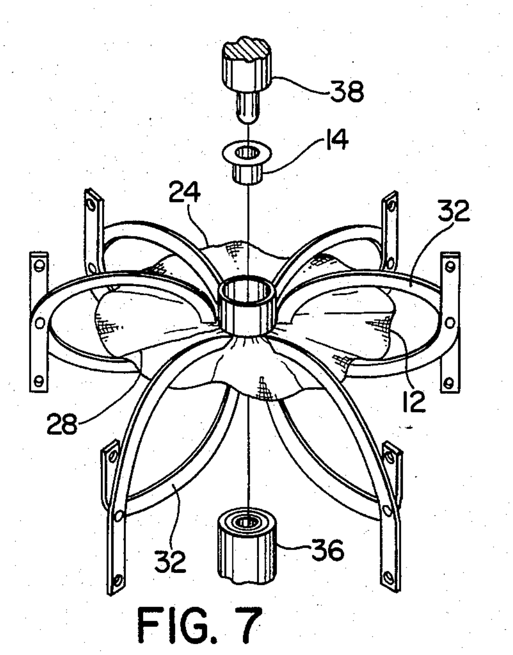

Referring now to the drawings, the method of the instant invention is illustrated in FIGS. 5-7, and it is seen that the method is operative for making a ruffled ornament of the type illustrated in FIGS. 1, 2, 8, and 9, and generally indicated at 10. In this regard, the ruffled ornament 10 comprises a decorative element 12 which is made of a flexible sheet material, such as a fabric, and a grommet 14 which retains the decorative element 12 in a ruffled configuration, as will hereinafter be more fully set forth. The ornament 10 is particularly effective for use as a decorative ornament in a barrette of the type illustrated in FIGS. 1 and 2 and generally indicated at 16, although the use of the ornament 10 as a decorative ornament in a variety of other devices is contemplated.

Figure 8:
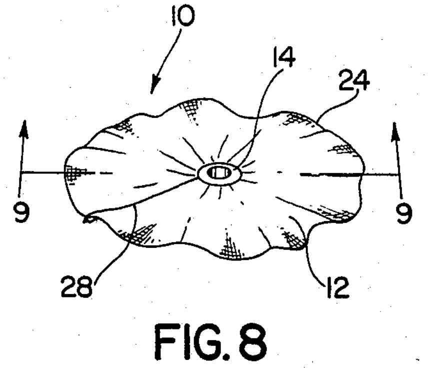
FIG. 8 is a perspective view of a fully formed ornament.
Figure 9:
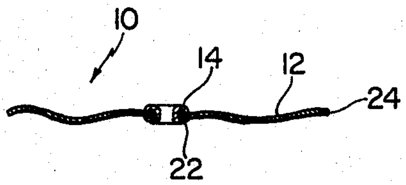
FIG. 9 is a sectional view taken along line 9—9 in FIG. 8.

Referring now more specifically to FIGS. 3-7, it is seen that the preferred form of the method of the instant invention is operative for forming a strip of sheet material 18, of the type illustrated in FIG. 3, into a tubular band 20, of the type illustrated in FIG. 4, and for then forming the band 20 into a partially flattened, ruffled configuration to form a decorative element 12. The method is thereafter operative for applying a grommet 14 to the decorative element 12 to retain it in a partially flattened, ruffled configuration. More specifically, in the first step of the preferred method, the strip 18 which has first and second edges 22 and 24, respectively, is formed into a tubular configuration and the opposite ends of the strip 18 are connected along a seam 28 to form the band 20. In the next step of the method, the band 20 is formed into a partially flattened, ruffled configuration to form the decorative element 12. This is accomplished by turning the portions of the band 20 which are adjacent the first edge 22 thereof inwardly and drawing them together so that a plurality of pleats are formed along the first edge 22, so that the band 20 is formed into a partially flattened configuration and so that a reduced central aperture 30 is formed in the element 12. Preferably, this is carried out by grasping the band 20 with a plurality of pairs of fingers 32 at a plurality of spaced points adjacent the first edge 22, and then turning the fingers inwardly and together so that they cooperate to turn and draw the portions of the band 20 which are adjacent the edge 22 inwardly and together to form a plurality of pleats along the first edge 22. The fingers 32 preferably comprise elements which cooperate in a scissors-like manner for grasping the band 20 adjacent the edge 22. In this regard, although it is contemplated that the pairs of fingers 32 could be operated manually, preferably they are connected to conventional linkage (not shown) of a type which is generally known in the mechanical arts for automatically manipulating them to grasp the band 20 and for thereafter manipulating them to form the band 20 into a partially flattened, ruffled configuration. In any event, it will be seen that after the band 20 has been formed into a partially flattened, ruffled configuration wherein it defines the decorative element 12, portions of the first edge 22 define the aperture 30, whereas the second edge 24 defines the perimeter of the element 12. In order to achieve a ruffled effect in the element 12, preferably the diameter of the tubular band 20 (when it is in an expanded circular configuration) is greater than twice the width of the strip 18, i.e. twice the distance from the first edge 22 to the second edge 24, so that when the band 20 is formed into the decorative element 12, the diameter of the element 12 is less than the diameter of the tubular band 20 from which it was formed. This provides a wrinkled or ruffled configuration in the perimetal portions of the element 12 as illustrated in FIGS. 6-8.

After the band 20 has been formed into the decorative element 12, the grommet 14 is assembled thereon so that it extends through the aperture 30 and clampingly engages portions of the element 12 which are adjacent the aperture 30 and in particular the pleats in the element 12 to retain the element 12 in a partially flattened, ruffled configuration. Preferably, this is carried out by first clamping portions of the element 12 which are adjacent the aperture 30 between first and second clamping members 34 and 36, respectively, as illustrated in FIG. 7, so that the central portions of the element 12 are secured by the elements 34 and 36. Preferably, the first clamping element 34 is of tubular configuration, and it is substantially coaxially aligned with the aperture 30 and dimensioned to receive an upper die 38 and the grommet 14 therethrough, and the second clamping element 36 is preferably defined by a second or lower die so that it is operative for both clamping the element 12 and for cooperating with the die 38 to secure the grommet 14 to the element 12. Accordingly, after the element 12 has been clamped between the first and second clamping elements 34 and 36, respectively, the grommet 14 is secured thereto so that it extends through the aperture 30 and clampingly engages portions of the element 12 which are adjacent the aperture 30 and in particular the pleats in the element 12 to secure the pleats and to retain the decorative element 12 in a partially flattened, ruffled configuration. Finally, after the grommet 14 has been secured on the element 12 to form the ruffled ornament 10, the ornament 10 is released from the fingers 32.

The ornament 10 is particularly effective for use in a barrette, such as the barrette 16, although the use thereof in a variety of ornamental applications is contemplated. The barrette 16 comprises a barrette element 40, the ornament 10, and a button 42 for securing the ornament 10 on the element 40. The barrette element 40 preferably comprises a base portion 44 having an aperture 46 therethrough, and a hingable clamping portion 48 for securing the barrette 16 on the hair of a wearer. The button 42 comprises a split shaft 50 having an enlarged head 52 which is receivable through the grommet 14 and the aperture 46 for securing the ornament 10 on the barrette element 40. In this regard, it has been found that in many cases it is preferable to also secure the ornament 10 on the barrette element 40 with an adhesive as well as with the button 42 in order to provide a firm attachment of the ornament 10 on the barrette element 40.

It is seen therefore that the instant invention provides an effective ornament which can be manufactured in accordance with the method of the instant invention at a substantially reduced cost. Specifically, because the ornament comprises a grommet 14 for securing the decorative element 12 in a partially flattened, ruffled configuration, the need for the time consuming stitching steps which have been required in the heretofore known methods to form elements such as the element 12 from bands such as the band 20, and to secure them in partially flattened configurations, is eliminated. Further, because the inventive method utilizes a plurality of pairs of spaced fingers to form the decorative element 12 from the band 20, the element 12 can be accurately formed and held in a position until the grommet 14 has been assembled thereon. Further, because the method of the invention utilizes the clamping elements 34 and 36 to secure the portions of the element 12 which are adjacent the aperture 30 in position during the assembly of the grommet 14 on the element 12, proper orientation of the grommet 14 on the element 12 is also assured. Hence, it is seen that the instant invention provides an effective method which can be reliably applied to form decorative ornaments, such as the ornament 10, at a substantially reduced cost. Accordingly, for these reasons as well as the other reasons hereinabove set forth, it is seen that the method and ornament of the instant invention represents significant advancements in the art which have substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A method of securing a decorative element of flexible sheet material in a partially flattened, ruffled configuration to form a ruffled ornament, said decorative element being formed from a tubular band of said sheet material, said band having first and second edges which define opposite ends thereof, the first edge of said band being turned and drawn inwardly and gathered together to form a plurality of pleats along said first edge which cooperate to form a reduced central aperture in said decorative element and to impart an at least partially flattened, ruffled configuration thereto wherein the outer periphery of said decorative element is defined by said second edge, said method comprising assembling a grommet on said decorative element through said aperture so that said grommet clampingly engages said pleats adjacent said first edge to retain said pleats and to secure said decorative element in said at least partially flattened, ruffled configuration.

2. The method of claim 1 further comprising the step of clamping said decorative element by engaging opposite sides thereof adjacent said aperture to retain it in said partially flattened, ruffled configuration before assembling said grommet thereon.

3. In the method of claim 2, said clamping step further characterized as clamping said decorative element between first and second clamping members, said first clamping member being of tubular configuration, said grommet being assembled on said band through said tubular first clamping member in said assembling step.

4. A ruffled ornament comprising a decorative element of flexible sheet material, said element being formed from a tubular band of said sheet material, said band having first and second edges which define opposite ends thereof, said first edge being turned and drawn inwardly and gathered together to form a plurality of pleats along said first edge which cooperate to form a reduced central aperture in said decorative element and to impart an at least partially flattened, ruffled configuration thereto wherein the outer periphery of said decorative element is defined by said second edge, and a grommet assembled on said decorative element, said grommet extending through said aperture and clampingly engaging opposite surface portions of said pleats adjacent said first edge to secure said pleats and to retain said decorative element in said at least partially flattened, ruffled configuration.

5. The ruffled ornament of claim 4 in combination with a barrette element, and means extending through said grommet for securing said ornament on said barrette element.

6. A method of forming a ruffled ornament comprising the steps of:

a. forming a tubular band of flexible sheet material, said band having first and second edges which define opposite ends thereof;

b. turning and drawing said band inwardly and together along the first edge thereof to form a plurality of pleats along said first edge which cooperate to form a reduced central aperture in said decorative element and to impart an at least partially flattened, ruffled configuration thereto wherein the outer periphery of said decorative element is defined by said second edge; and c. assembling a grommet on said decorative element so that it extends through said aperture and clampingly engages said pleats adjacent said first edge to retain said pleats and to secure said decorative element in said at least partially flattened, ruffled configuration to form said ornament.

7. In the method of claim 6, said turning and drawing step comprising:

a. grasping said band with a plurality of pairs of fingers at a plurality of spaced points adjacent said first edge; and b. turning said fingers inwardly and together to form said decorative element.

8. The method of claim 7 further comprising the step of clamping said decorative element by engaging opposite sides thereof adjacent said aperture to retain it in said partially flattened, ruffled configuration before assembling said grommet thereon.

9. In the method of claim 8, said clamping step further characterized as clamping said decorative element between first and second clamping members, said first clamping member being of tubular configuration and being substantially concentric with said aperture, said grommet being assembled on said band through said tubular first clamping member in said assembling step.

* * * * *